Nov. 20, 1923.
W. E. BURROUGHS
HOSE COUPLING
Filed Sept. 14, 1921
1,474,995
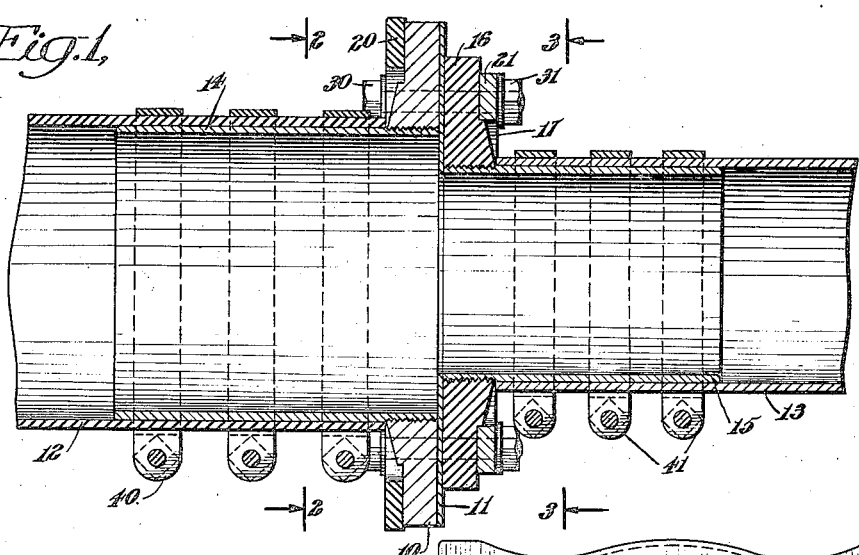
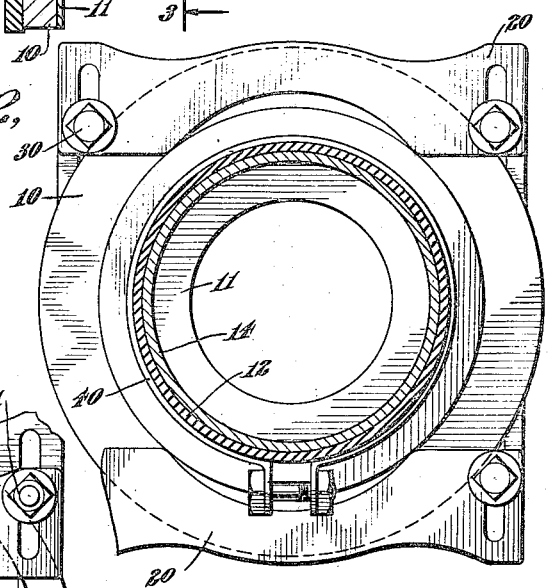
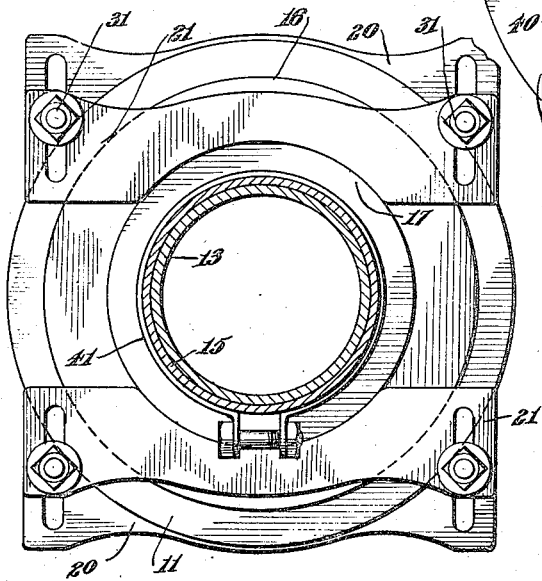
INVENTOR
William E. Burroughs
BY
ATTORNEY Patented Nov. 20, 1923.

1,474,995

UNITED STATES PATENT OFFICE.

WILLIAM E. BURROUGHS, OF BROOKLYN, NEW YORK.

HOSE COUPLING.

Application filed September 14, 1921. Serial No. 500,623.

*To all whom it may concern:*

Be it known that I, WILLIAM E. BURROUGHS, a citizen of the United States of America, and a resident of Brooklyn, county of Kings, and State of New York, have invented certain new and useful Improvements in Hose Couplings, of which the following is a specification, reference being had to the accompanying drawings, forming a part thereof.

This invention relates to hose couplings, and more particularly to such couplings for use in transferring fluid between ships. In transferring fluid, such as fuel oil or the like, from one ship to another, as, for example, from a loading barge to a receiving ship, it is the usual practice to employ flexible hose between the ships for conducting the fluid. It sometimes happens that the ship to be loaded employs a hose having a diameter unlike that of the loading barge, and it is the purpose of the present invention to provide improved couplings for interconnecting such hose of unlike diameters.

A feature of the invention is the provision of annular members which may be coupled to one another in pairs in varying combinations, whereby such members may be selected in accordance with the diameter of hose to be coupled and secured to one another in a minimum of time. Thus with a minimum of parts a large number of combinations of hose may be interconnected in a highly efficient manner.

Another feature relates to the provision of clamping means of improved design whereby ring members of varying sizes may be securely clamped together.

Other objects will appear as the description of the invention progresses.

Referring to the drawing:

Figure 1 shows a longitudinal section of the hose coupling of my invention together with a portion of the hose.

Figure 2 shows a section taken on the line 2—2 of Figure 1, and

Figure 3 shows a section taken on the line 3—3 of Figure 1.

Like parts are designated by the same reference characters in all figures in the drawing.

Referring to the drawings, one embodiment of my invention comprises a pair of ring shaped members 10, 11, which may be selected from a stock of such ring members according to the size of hose to be coupled. In the present instance, the ring member 10 is selected in accordance with the diameter of the associated hose 12 and similarly the ring member 11 is selected in accordance with the size of the associated hose 13. The inner periphery of each ring member is screw-threaded for the purpose of engaging a sleeve, such as 14, 15. A gasket 16 is provided between the two ring members 10 and 11 to prevent escape of fluid in a well known manner.

For the purpose of securing the ring members 10 and 11 together in cooperative relation there is provided a plurality of flange bars 20, 21, each of which is provided at each of its end portions with a slot extending transversely of the bar; and through its middle portion is formed to engage the outer periphery of a shoulder 17 of the respective ring member. The curvature of the middle portion of the bar is such as to handle a variety of ring members having various degrees of curvature. In some cases, the point of engagement of the bar of the ring member may be at or near the center line of the bar and in other cases it may be spaced therefrom, for example, in Figure 1, the point of engagement of the bar 21 is shown at the middle portion, (see Fig. 3), while the points of engagement of the bar 20 are shown apart from the center line (see Fig. 2).

The bolts 30 are arranged to extend through the slots of the bars 20, 21, and are secured by suitable nuts, such as 31. The ring members are thus held securely together but may readily be separated to form a new combination by merely unscrewing the bolts.

The sleeve 14 is spaced within the hose 12 and suitable hose clamps, such as 40, are screwed down to make a tight engagement. Similarly, the sleeve 15 is inserted into the end of the hose 13 and suitable hose clamps, such as 41, are screwed down to make a tight engagement.

Thus it will be seen that I have provided a coupling which is readily interchangeable with members of different sizes to effect interconnections between hose of unlike diameters, it being necessary to carry in stock on the loading barge or ship merely such parts as relate to the different sizes of hose instead of having to have pipe couplings corresponding to all of the different combinations which may be met with in practice. The interchange of the parts may be readily effected without appreciable loss of time.

Apparatus of preferred form and construction has been illustrated and described for the purpose of showing a way in which this invention may be practiced, but the inventive thought upon which this application is based is broader than this illustrative embodiment. It is therefore understood that the scope of the invention is not to be limited by the present disclosure, reference being had to the appended claims for that purpose.

What is claimed is:

1. In apparatus for hose, coupling means secured to adjacent ends of the hose to be coupled, comprising a pair of members corresponding in shape to a cross-section of the respective hose, each of the members having an orifice through which the respective hose may pass, a plurality of substantially flat bars each having a lateral edge formed in its intermediate portion to correspond approximately to the shape of one of the ring members and each having a transverse slot in each of its end portions, the slots being disposed outwardly of the outer edge of said members when the intermediate portion of the respective bar engages a portion of one of said members, and fastening means passing through said slots to secure the bars together in pairs with the pair of members between them.

2. In apparatus for hose, coupling means secured to adjacent ends of the hose to be coupled, comprising a pair of circular members each having an orifice concentric with the respective hose, a plurality of substantially flat bars each having a lateral edge formed in its intermediate portion to correspond approximately to the shape of one of the ring members and each having a transverse slot in each of its end portions, the slots being disposed outwardly of the periphery of the ring members when said intermediate portion of the respective bar engages a portion of the ring member, and fastening means passing through said slots to secure the bars together in pairs with the ring members between them.

3. In apparatus for hose, coupling means secured to adjacent ends of the hose to be coupled, comprising a pair of ring-shaped members each having a flat face and a face provided with an annular shoulder, the orifice of each of said ring-shaped members being concentric with the end of one of the hose to be coupled, a plurality of substantially flat bars each having a lateral edge formed in its intermediate portion to engage the annular shoulder of a respective ring member, each of the bars having a transverse slot in each of its end portions, the slots being disposed outwardly of the outer pepriphery of the ring members when said intermediate portion of the bar engages the annular shoulder of the respective ring member, and fastening means passing through said slots to secure the bars together in pairs with the ring members between them.

4. In a hose coupling, a pair of ring-shaped members, the orifice of each member being concentric with the end of one of the hose to be coupled, a plurality of bars each formed intermediate its ends, to engage one of the ring members and each of the bars having a slot in its respective ends disposed outwardly of the outer periphery of the corresponding ring member when the intermediate portion of the bar engages said member, and fastening means passing through said slots to secure the bars together in pairs with the ring members between them.

5. In a hose coupling, a pair of ring members each secured to an end of a hose, a plurality of bars formed to clamp the ring members together and having slots outwardly disposed relative to the points of engagement, and bolts passing through the slots for securing the bars together in pairs.

In witness whereof I have hereunto set my hand this 8th day of September, 1921.

WILLIAM E. BURROUGHS.